United States Patent [19]
Underwood

[11] Patent Number: 5,299,459
[45] Date of Patent: Apr. 5, 1994

[54] ADAPTIVE CONTROL METHOD FOR MULTIEXCITER SINE TESTS

[76] Inventor: Marcos A. Underwood, 21850 Byrne Ct., Cupertino, Calif. 95014

[21] Appl. No.: 576,416
[22] PCT Filed: May 21, 1990
[86] PCT No.: PCT/US90/02761
§ 371 Date: May 15, 1991
§ 102(e) Date: May 15, 1991
[51] Int. Cl.$^5$ .............................................. G01M 7/00
[52] U.S. Cl. ........................................ 73/664; 73/602; 364/508
[58] Field of Search ................... 73/664, 602; 364/508, 364/512; 340/683

[56] References Cited

U.S. PATENT DOCUMENTS

| | | | |
|---|---|---|---|
| 3,710,082 | 1/1973 | Sloane et al. | 73/664 |
| 4,061,017 | 12/1977 | Sloane et al. | 73/664 |
| 4,181,029 | 1/1980 | Talbott, Jr. | 73/664 |

*Primary Examiner*—Louis Arana
*Attorney, Agent, or Firm*—Michael J. Hughes

[57] ABSTRACT

A multiexciter digitally swept-sinewave vibration test controller employing an adaptive control method which compensates for nonlinear and time variant physical characteristics of a system under test and for instrumentation errors. A system under test (12) is stimulated using an exciter array (26) and response is measured using a sensor array (28). The exciter array (26) is driven by signals produced by a digital vector swept oscillator (18). A control loop (14) is used to modify signals to the exciter array (26) based upon input from the sensor array (28). A digital processing system (24) processes signals in the control loop (14). Within the digital processing system (24), a system impedance matrix (44) containing values representing the inverse of response characteristics of the system under test (12) is updated to approximate an "actual" system impedance matrix. A drive signal matrix (52) is modified to cause the digital vector swept oscillator (18) to produce updated drive signals. An amount by which the updated system impedance matrix (44) is allowed to modify each iteration of the drive signal matrix (52) is controlled by a variable adjustment gain scalar (48). Value of the adjustment gain scalar (48) is determined using values obtained in a preceding iteration of the control cycle.

20 Claims, 2 Drawing Sheets

ADAPTIVE CONTROL METHOD FOR MULTIEXCITER SINE TESTS

TECHNICAL FIELD

The present invention relates generally to a method for correcting for nonlinearity in system characteristics during a vibration test, and more particularly to a method for accurately controlling stimuli applied by a multiexciter swept-sinewave control system so as to keep a resultant response matrix within acceptable limits. The predominant current usage of the adaptive control method for multiexciter swept sine tests of the present invention is in controlling the forces applied in the process of vibration stress analysis of engineered articles of manufacture.

BACKGROUND ART

Numerous factors have combined to create a need for increasingly accurate and repeatable stress and vibration testing of structures and devices. Among these are the trend to build things lighter and stronger, the increasing usage of new and untested materials, and an increasing awareness of the need for predictability and safety in the design and manufacture of products. Therefore, the field of vibration testing is rapidly advancing. Vibration testing is performed on actual items of manufacture where size and economy permit. Where this is not feasible, vibration testing may be performed on scale models or mock ups of items thought to have the same relative resistance to vibration as the actual items of interest.

U.S. Pat. Nos. 3,710,082, and 3,848,115, both issued to Sloane et al., are concerned with the process of controlling essentially random signals with the objective of maintaining an overall spectral density of a vibration pattern within acceptable limits. Such an approach recognizes the random nature of many naturally occurring vibration sources. While this conceptual approach is perfectly valid and correct, it has been recognized that a more precisely defined stimulus might lead to a higher degree of repeatability in testing. One approach that has been tried is to use motive stimulus defined by sine waves. Any complex wave can be synthesized using a combination of sine waves. Therefore, a multiexciter system with each exciter being driven by precisely controlled sums of sine waves could, theoretically, produce any desired complex vibration pattern in a structure. In a multiexciter system, stimulus, and response are best described by vectors of dimension N and impedance factors are best described by a matrix of N by N dimensions, with N being the number of stimulus/response points involved.

The objective of a multiexciter swept-sinewave test is to impart a controlled stimulus to a structure at specified points via a series of actuators. A desired stimulus can be represented as a complex vector spectrum. A multiexciter controller, through feedback, continuously excites the structure, measures the response spectral vector at the control points, and modifies the drive signal spectral vector until the response vector agrees with the desired stimulus vector to within some acceptable error tolerance.

In the past, these tests have been performed using purely analog means. In the analog systems, phase relationships between response points were controlled by inducing phase shifts between the drive signal components as a function of the phase difference between the response points. However, the analog approach proved to be largely unsuccessful at frequencies near structural resonance frequencies, since cross coupling effects between the drive signal components and the structure's frequency response characteristics were not accounted for.

More recently, digital approaches have been tried with greater success. The most important reason for the success of digital control systems in these applications is that digital systems can employ a feedback control algorithm that accounts for structural cross coupling effects by using a structural frequency response matrix measured before the test. U.S. Pat. No. 4,782,324, issued to the present inventor, teaches a method and apparatus for converting a digital signal into an analog signal useful for vibration exciter stimulation.

However, even the currently available digital control systems will not provide the desired degree of control when applied to nonlinear and/or time varying systems because the frequency response matrix estimate used by the control system may differ from the actual frequency response matrix existing during the test. For instance, nonlinear stiffness effects will generally cause a shift in the resonant frequency that will cause a large deviation in the phase of the measured frequency response matrix as compared to the response matrix which the control system actually encounters as it is conducting the swept sine test. These potentially large phase discrepancies can cause control system instabilities. Further, imperfections in controller drive and response circuits can lead to undetected inaccuracies in conventional systems. Clearly, there is a need to be able to dynamically compensate for nonlinear and time variant deviations in a structure response matrix during vibration testing, and to detect and correct for other system inaccuracies.

All of the prior art systems for digitally controlling multiexciter swept-sinewave vibration testing within the inventor's knowledge have employed a predetermined and set structural frequency response matrix.

No prior art controller to the inventor's knowledge has successfully compensated for non linear or time variant factors in a system frequency response matrix. All multiexciter swept-sinewave vibration test controllers to date have suffered a high degree of inaccuracy or instability when encountering such variable factors, especially near structural resonance frequencies.

DISCLOSURE OF INVENTION

Accordingly, it is an object of the present invention to provide a controller for multiexciter swept-sinewave vibration testing which will produce a desired complex stimulus vector spectrum at a full range of frequencies including those near structural resonance.

It is another object of the present invention to provide a controller for multiexciter swept-sinewave vibration testing which will correct for instrumentation errors, such as low matching of phase and amplitude between driver input channels, low coherence between exciter drive vector and control point response vector, and low dynamic range of the input and output channels.

It is still another object of the present invention to provide a means for dynamically adjusting a drive signal spectral vector in a multiexciter swept-sinewave vibration test to compensate for non linear and time variant characteristics of the structure under test.

It is yet another object of the present invention to provide a means to correct for factors in a multiexciter swept-sinewave test control system which would tend to cause a drive signal spectral vector to vary from a desired stimulus spectral vector.

Briefly, the preferred embodiment of the present invention is a digitally controlled multiexciter swept-sinewave vibration test controller employing the inventive method to refine an estimate of system impedance values during the control process for causing a control point response spectral vector to agree with a desired reference spectral vector. As with previous swept-sinewave controllers, the inventive controller functions by employing a feedback control algorithm that accounts for structural cross coupling effects in a structure under test by using a structural frequency response matrix. However, the controller of the present invention has the capability of adjusting the structural frequency response matrix during testing and then modifying drive signals accordingly.

System stability is insured by application of an optimization process to the adaptive control process.

An advantage of the present invention is that test reliability and repeatability are enhanced by improved control of vibration stimuli.

A further advantage of the present invention is that test integrity is maintained even at structural resonance and anti-resonance frequencies of a structure under test.

Yet another advantage of the present invention is that unacceptable instability is not introduced into a test by time variant or nonlinear characteristics of a structure under test.

Still another advantage of the present invention is that inaccuracies and instability due to instrumentation errors in a controller feedback system are effectively reduced.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is a multiexciter swept-sinewave vibration controller suitable for implementing the inventive adaptive control method. The predominant expected usage of the inventive adaptive control method is in the design experimentation and quality control phases of the production of structural items and components of items which are intended to withstand vibration forces. The inventive method is particularly useful in the testing of relatively large or complex structures which are capable of complex resonance or of physical characteristics that vary with time, with frequency, or with other test parameters.

Figure 1:
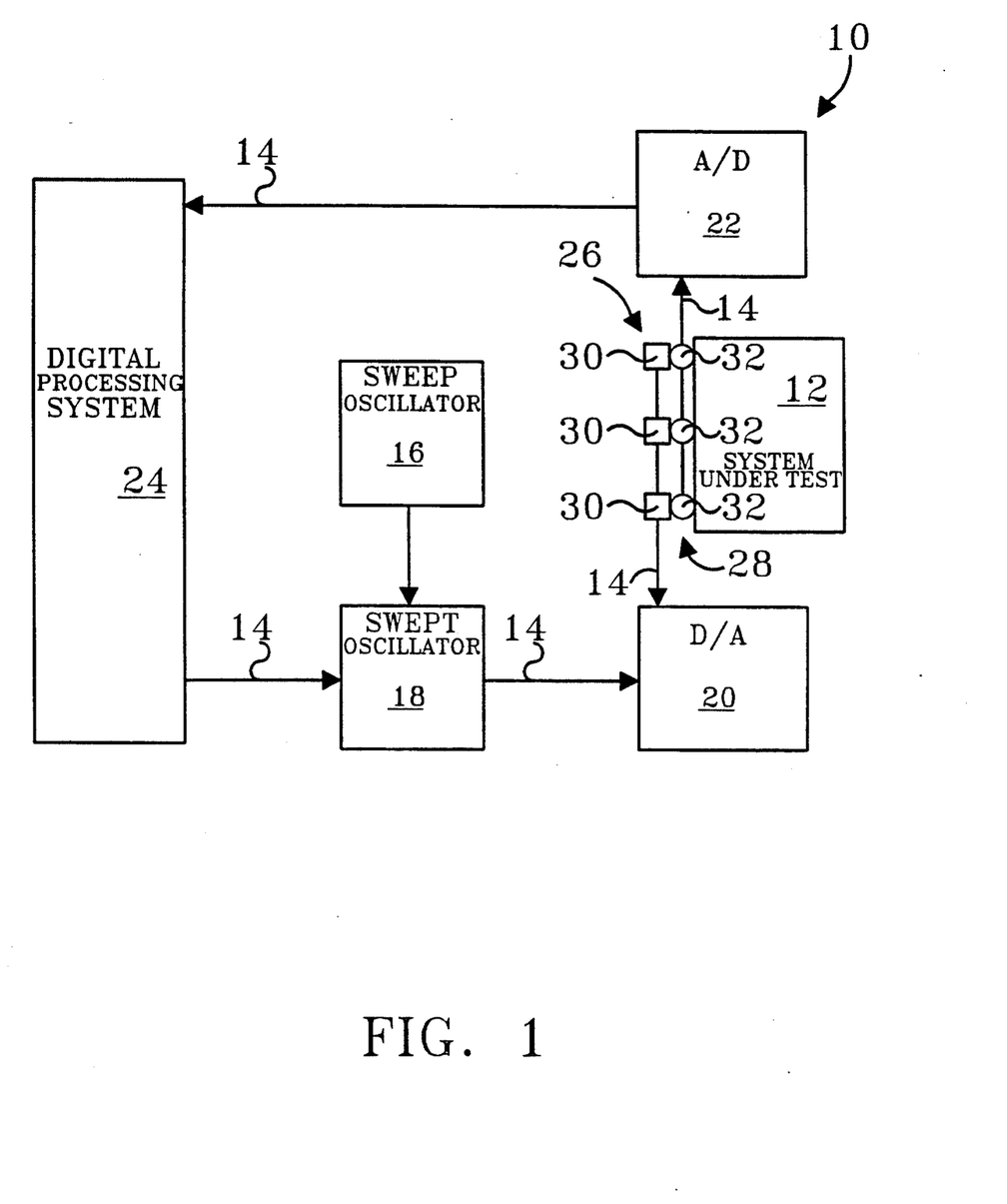
FIG. 1 is a block diagram of a swept-sinewave controller employing the inventive method.

The controller of the presently preferred embodiment of the present invention is illustrated by means of a block diagram in FIG. 1 and is designated therein by the general reference character 10. Also shown in FIG. 1 is a system under test 12 which, along with the controller 10 form portions of a closed control loop 14. In many of its substantial components and processes, the controller 10 does not differ significantly from conventional multiexciter swept-sinewave controllers. The physical structure is similar to that of prior art controllers.

The conventional elements of the controller 10 include a digital sweep oscillator 16, a digital vector swept oscillator 18, a D/A subsystem 20, an A/D subsystem 22 and a digital processing subsystem 24. Completing the closed control loop 14 are an exciter array 26 and a sensor array 28. The exciter array 26 is made up of a quantity of exciters 30 chosen by a user of the controller 10 to be the most desirable for the system under test 12. The locations of the exciters 30 on the system under test 12 are also chosen by the user according to established principles which form no part of the present invention. For illustrative purposes, the control loop 14 is shown in FIG. 1 to include three exciters 30. In this example of a configuration for usage of the best presently known embodiment 10 of the inventive controller, the sensor array 28 contains a quantity of sensors 32 equal to the quantity of exciters 30, being three in the present example. However, as will be discussed hereinafter, the present invention may also be used with "non-square" systems in which the quantities of exciters 30 and sensors 32 are not identical. The sensors 32 are placed as close as possible to the exciters 30 so as to avoid, as much as possible, error in the feedback loop 14 resulting from dissimilarity between motion actually present at the exciters 30 and that sensed at the sensors 32.

During testing, the digital vector swept oscillator 18 modifies a digital equivalent of a sine wave signal created in the digital sweep oscillator 16 according to input derived from the digital processing system 24. The D/A subsystem converts the modified digital equivalent signal into an analog signal suitable for driving the exciters 30. The exciters 30 may be any of the commonly available linear or rotary types of electromechanical exciter devices. The present inventor's U.S. Pat. No. 4,782,324 teaches a method and apparatus for converting a digital signal into a band limited analog signal which is used in the inventive controller 10. When the exciters 30 have stimulated the system under test 12, the sensors 32 measure the resultant response. If there were but one exciter 30 and one sensor 32, a response measured at that one sensor 32 could rightly be considered to be the effect of the stimulus imparted by the one exciter 30. However, since in the present example three exciters 30 and three sensors 30 are used, responses measured at the sensors 32 must be considered to be an N dimensional vector, with N being the total number of exciter 30 and sensor 32 pairs. Analog response signals created by the sensors 32 are converted to digital equivalents by the A/D subsystem 22, which digital input is provided to the digital processing system 24.

Figure 2:
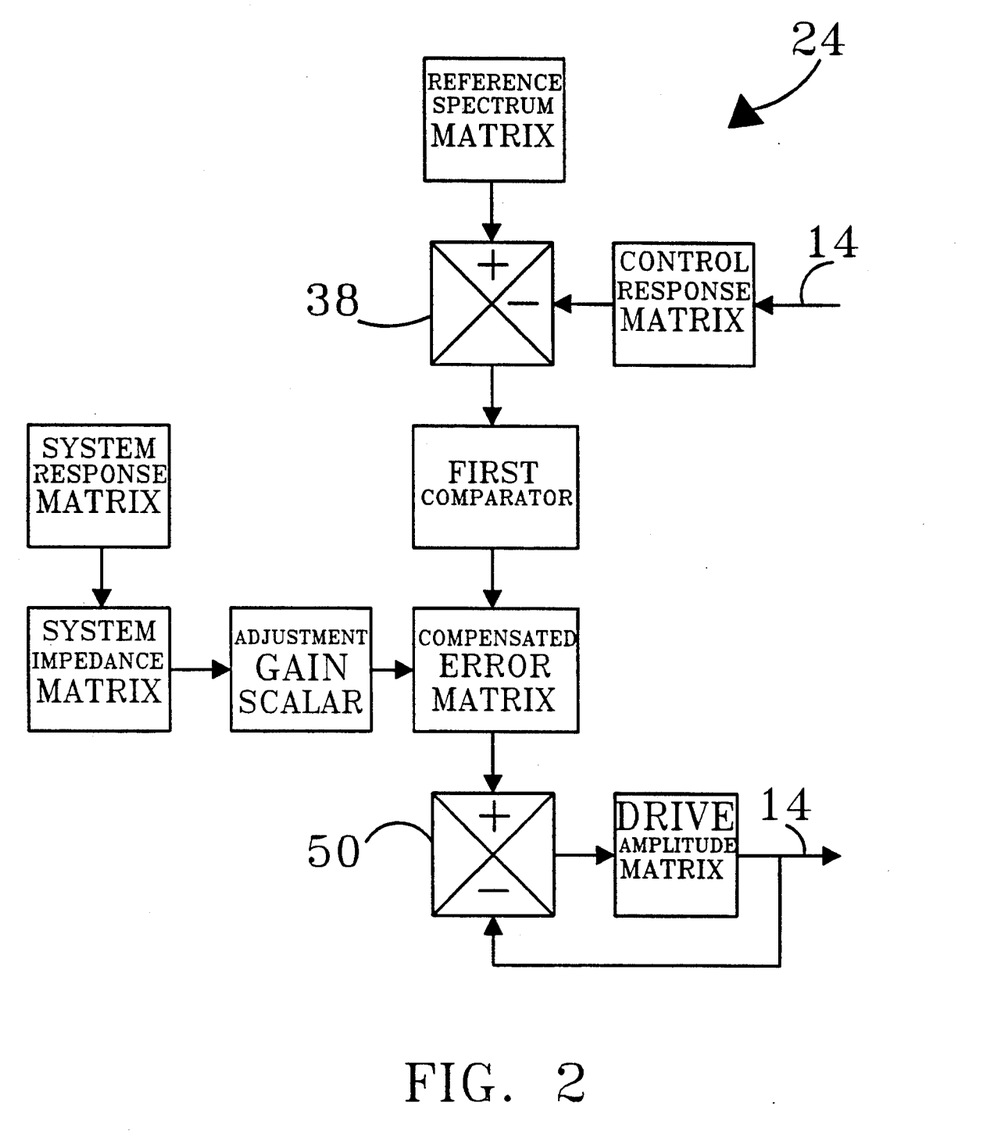
FIG. 2 is a flow diagram showing digital signal processing steps to implement the inventive method within a digital signal processing system.

Referring now to FIG. 2, wherein is shown a block flow diagram of the digital signal processing flow which occurs within the digital processing system 24, it can be seen that the outputs of the A/D subsystem 22 are provided to the digital processing system via the feed-back loop 14 and are resolved into a control response vector 34. It should here be noted that the enumerated features of FIG. 2 represent analog equivalents of the digital manipulation that actually occurs within the digital processing system 24. The notation is customary for depicting analog equivalents of digital signal processing steps. As one familiar with the art of digital signal processing would appreciate, actual mathematical functions may be performed in an order not directly correlative to the analog equivalents depicted. Transformation of the analog equivalent shown into the digital signal processing actually performed is according to well known practices and is not unique to the present invention. The control response vector 34 is compared to a reference spectrum vector 36 at a first comparator 38. A control error vector 40 results from the first comparator 38. Individual values of the control error vector 40 will be positive where corresponding reference spectrum vector 36 values are higher than control response vector 34 values, and negative where reference spectrum vector 36 values are lower than control response vector 34 values. A compensated error matrix 42 is produced by adjusting the control error vector 40 according to a system impedance matrix 44. The system impedance matrix 44 is the set of inverse values of values contained in a system response matrix 46. Initial values for the system response matrix 46 are determined prior to beginning a test by stimulating the system under test 12 sequentially with individual exciters 30 and measuring the response of the system 12 at each sensor 32. An adjustment gain scalar 48 is the factor by which the control error vector 40 is adjusted by the system impedance matrix 44. Means for adjusting the control error vector 40 by the system impedance matrix 44 are well known and practiced in the art, and are not unique to the present invention.

The compensated error matrix 42 is provided to a second comparator 50. The second comparator 50 produces an updated drive signal 52 which is provided as an output to the feed-back loop 14. It is important to note that the operation described above is both cyclical and continuous in nature, and that the updated drive signal vector 52 being instantaneously provided to the feedback loop 14 is also provided as an input to the second comparator 50 such that each succeeding cycle has as one component of the updated drive signal vector 52 the updated drive signal vector 52 of the previous cycle.

In mathematical terms the above described functioning of the digital processing system 24 can be described as follows:

$$\{D_{n+1}(f)\} = \{D_n(f)\} + g[Z_m(f)](\{R(f)\} - \{C_n(f)\})$$

where;
$D_n(f)$ = current values of the updated drive signal 52;
$D_{n+1}(f)$ = next subsequent values of the updated drive signal 52;
g = value of the adjustment gain scalar 48;
$Z_m(f)$ = values of the system impedance matrix estimate 44;
$R(f)$ = values of the reference spectrum vector 36;
$C_n(f)$ = values of the control response vector 34; and where the subscript "n" represents the number of the current repetition and the subscript "m" represents the fact that the associated quantities are measured and determined prior to beginning the first test cycle.

It has been the practice in the industry to determine the value of the adjustment gain scalar 48 at the outset of the test to be a value "g" which is sufficiently large to result in a reasonably quick system convergence, while remaining small enough to reduce potential instability problems caused by repeated excessive over correction of the compensated error matrix 42 and, thus, of the updated drive signal vector 52. Note that negative values of "g" have to be used when phase errors greater than 90° are present in measured values of the system response matrix 46. Further, the values of the system response matrix 46 have also heretofore been fixed during the test at values set prior to the beginning of the test, as explained previously herein.

However, as is also explained previously herein, while the digital processing system 24, as defined thus far, will attempt to cause the control response vector 34 to converge on the reference vector 36 values, it implicitly uses assumptions that the system impedance matrix 44 is an accurate measure of actual system characteristics under dynamic test conditions. As discussed previously, this may not be a good assumption, particularly over time as overall system conditions, such as frequency and magnitude of input stimuli, vary.

Therefore, in accordance with the method of the present invention, a series of system response matrices 46 is produced which converge to the inverse of an "actual" system frequency response matrix "H(f)" (not shown). As will be discussed hereinafter, an "actual" system response matrix, because it may continually vary and because it is not amenable to precise measurement, cannot be precisely defined, and trying to define it is best viewed as a goal that can never quite be achieved. Further, the presently preferred embodiment of the present invention employs a variable complex value for the adjustment gain scalar 48 which can compensate for phase errors that can exist in updated system response matrices 46 during early stages of the update process, instead of the fixed value "g". The difficulty in the process arises from the fact that any obvious approaches to this require that the indefinable "actual" system response matrix be known. The inventor has applied aspects of optimization theory with aspects of control problem theory and an application of an algorithm that attempts to minimize an objective function to derive the unique process described herein which provides a means for accomplishing this seemingly impossible control dilemma.

According to the method of the present invention, the system impedance matrix 44 is updated according to the formula:

$$[Z_{n+1}(f)] = \left( [I_N] + \frac{(\{S_n(f)\} - [Z_n(f)](\{C_{n+1}(f)\} - \{C_n(f)\}))\{S_n(f)\}^*}{<[Z_n(f)](\{C_{n+1}(f)\} - \{C_n(f)\}), \{S_n(f)\}>} \right)[Z_n(f)]$$

where:
$S_n(f)$ = values of the compensated error vector 40;
$Z_n(f)$ = values of the system impedance matrix 44;
$C_{n+1}(f)$ = next subsequent values of the control response vector 34;
$C_n(f)$ = present values of the control response vector 34;
$Z_n(f)$ = present values of the system impedance matrix 44;
$Z_{n+1}(f)$ = next subsequent values of the system impedance matrix 44;
$I_N$ = the N dimensional identity matrix with N being the number of exciters 30 and sensors 32 in use.

It should be noted that, in accordance with the usage of the present invention, values of the compensated error vector 40 may properly also alternately be referred to as a vector "step" magnitude and direction because:

$$\{S_n(f)\} = a_n[Z_n(f)](\{R(f)\} - \{C_n(f)\}) = \{D_{n+1}(f)\} - \{D_n(f)\}$$

where;

$a_n \equiv$ present value of the adjustment gain scalar 48.

In other words, the compensated error vector 40 is the amount by which values of the drive signal vector 52 are "stepped" between each cycle.

Values of the (variable) adjustment gain scalar 48 are determined by using a variation of a classic steepest decent approach according to a formula and method described hereinafter. The resulting value $a_n$ is a steepest decent complex gain value for the adjustment gain scalar 48. Application of this method results in a change in control error matrix 42 values between two successive control loop iterations which are strictly non-negative. This means that control error matrix 42 values will decrease even for arbitrary invertible values of the system impedance matrix 44. This helps to assure that the controller 10 will be stable. The use of a complex number for $a_n$ is a refinement of the previously mentioned technique of using negative values of gain where phase deviation between values of the system response matrix 46 exceeds 90°.

Furthermore, the vectors $(S_n(f)) = a_n[Z_n(f)](\{R(f)\} - \{Cn(f)\})$ can be shown to be conjugate, since they are the outcome of a steepest descent approximate Hessian algorithm. Also, the impedance update, $[Z_{n+1}(f)]$ satisfies the secant equation:

$$[Z_{n+1}(f)](\{C_{n+1}(f)\} - \{C_n(f)\}) = \{S_n(f)\}$$

These two conditions guarantee (hypothetically) that the system impedance matrix 44 will converge to the "actual" impedance matrix within N steps, where N is the number of independent exciters 30 that are being used to conduct the test, if the underlying system being controlled is both linear and time invariant.

The above described steps result in a method for estimating the impedance of the system 12 during the control process. The process is essentially stable and, converges in at most N iterations for linear and time invariant systems 12. In the event the system under test 12 is nonlinear or time variant, the method will track the impedance of the system 12 as it varies with drive and control response amplitudes and frequencies. Obviously, the controller 10 will not converge exactly in a finite number of steps.

The one remaining unresolved problem in the basic scheme is that values of the complex quantity $a_n$ depend upon an unknown which is, generally, just as unknown as the "actual" system response matrix [H(f)]. To solve this dilemma, the inventor has employed a "two step control loop" within a "learning" loop is used to determine a value which is then used to calculate $a_n$, which is then used in a "control" loop. The "control" loop uses $a_n$ to correct as much of any remaining error as is possible. The result of the "control" loop is then used to update impedance estimates followed by yet another "learning" loop. The cycle is repeated until the system 12 is brought under control.

To accomplish the "two step control loop" process, a variation of the classical multiexciter control update discussed previously is used:

$$\{\hat{D}_n(f)\} = \{D_n(f)\} + c_n[Z_n(f)](\{R(f)\} - \{C_n(f)\})$$

where $\{\hat{D}_n(f)\} \equiv$ values of the drive signal vector 52 for the "learning" loop; and $c_n \equiv$ value of the adjustment gain scalar 48 for the "learning" loop.

In the presently preferred embodiment of the invention, an initial value of approximately 0.1 is chosen for $c_n$ in order to minimize control errors associated with using a possibly erroneous impedance estimate in the system impedance matrix 44. Values of $c_n$ are allowed to increase as confidence in the accuracy of values within the system impedance matrix 44 is increased. Following the "learning" loop, the system under test 12 will respond with a "feed-back" loop response value of the control response vector 34:

$$\{\hat{C}_n(f)\}$$

From this, a value for the variable adjustment gain scalar 48 can be calculated as follows:

$$a_n = \frac{c_n <(\{R(f)\} - \{C_n(f)\}),(\{\hat{C}_n(f)\} - \{C_n(f)\})>}{\|\{\hat{C}_n(f)\} - \{C_n(f)\}\|^2}$$

As confidence in the values of the variable system impedance matrix 44 increases, as measured by the value of $a_n$, the value of $c_n$ is allowed to approach 1.0. It should be noted that an additional benefit can be derived from monitoring the value of $a_n$. Since, as previously discussed, values of the "actual" system response [H(f)] cannot be known exactly, it is useful to note that the value of $a_n$ is the best indicator of the instant reliability of the current working values of the system response matrix $[Z_n(f)]$ 46.

The results described herein are relatively independent of the initial value chosen for $c_n$ and the rate at which it is allowed to approach 1.0. However, obviously too small a value for $c_n$ will cause ill-conditioning of the $a_n$ calculation, and too large a $c_n$ makes the controller 10 too sensitive to system nonlinearities. Therefore, care in choosing these values must still be exercised, and only some minor experimentation with each different system will suffice to try to optimize these values.

As described herein, a process for obtaining and using all necessary values to achieve the described objectives can be achieved by the interdependent steps of the inventive process. All of the quantities required are available during either the "learning" loop or the "control" loop. Use of the inventive method does potentially increase control error during initial iterations due to potential errors in initial values assigned to the system response matrix 44. Careful selection of values for $c_n$ minimizes this problem.

Remaining problems to be addressed concerning the present invention relate to sources of inaccuracy that are inherent in any similar multiexciter sine wave type system. Following is a discussion of how these problems are dealt with in accordance with the best presently known embodiment of the present invention.

The first such problem is low coherence between the drive vector matrix 50 and the control point response vector 34. This low coherence results from noise in the measurement of the control response vector 34 which is independent of signals resulting from the drive vector 52. This sort of error is corrected in the best presently known embodiment of the present invention by employing a a numeric algorithm to synthesize a tracking filter in the digital domain in order to measure the response at the fundamental frequency of the drive signal. Algorithms for synthesizing analog filter equivalents are well known and widely practiced in the industry. This limits the effects of the contaminating noise by reducing the bandwidth of the noise to match the bandwidth of the tracking filter. Results of multiple complex amplitude measurements are also averaged over several repetitions to reduce the effects even further. However, remaining noise still has an effect, and the greatest effect will result near convergence of the system impedance matrix 44 to the "actual" system impedance.

A second such problem to be addressed is the effect of poor matching between the several electrical channels leading from the sensors 32. The mismatch is a result mainly of differences between characteristics of low-pass filters that are used ahead of the A/D converter channels in the A/D subsystem 22 to prevent aliasing errors. The inventor has found that this problem can be corrected by the same means used with more conventional means of measuring frequency response matrices. One solution is to use very high quality components so as to match characteristics of all channels to some acceptable level, such as ±0.1 dB in amplitude and ±1.0 degree in phase. Another workable solution is to use a software based calibration procedure, such as measuring the frequency characteristics of the input subsystem and correcting the input signal estimates thereby. Both methods have been successfully employed with the present invention. The best presently preferred embodiment uses the method of employing high quality components. While this method is the more costly, it has proven to be preferable.

A third such universal problem is that of low input and output dynamic range. This causes noise to appear on both the input vector 34 and on signals resulting from the output vector 52. These problems are caused by finite resolutions of the A/D subsystem 22 and D/A subsystem 20, or by low efficiency transducers being used as exciters 30 or sensors 32. The problem is aggravated by the fact that significant levels of signal component are produced at frequencies other than the excitation frequency. Presence of these additional signal components results in fundamental frequency response being described by a small digital value in the A/D subsystem 20. The result is a larger percentage error in the control response vector 34. The best solution to minimize this problem has been found to be the use of high-resolution components such as 16 bit converters in the A/D subsystem 22 and the D/A subsystem 20, and the use of full scale excursions of high quality transducers consistent with analog test levels.

By employing these several techniques in conjunction with the inventive method for updating the system impedance matrix 44 and for selecting appropriate variable values for the adjustment gain scalar 44 during the test, the inventor has found that the resulting controller 10 provides a significant improvement over prior art vibration control systems.

As discussed herein, the controller 10, according to the present invention, effectively solves the problem of inaccurate system impedance estimates caused by time variant or non-linear system characteristics. It should be further noted that the present invention provides an additional benefit in that any synergistic effects caused by operating multiple exciters 30 simultaneously, which could not be accounted for using prior art technology, are not missed using the inventive controller 10, since all measurements are taken under actual operating conditions will all exciters 30 in operation. This last could prove to be one of the more important advances in the field made by the present invention.

As is shown above, in great part, the controllers 10 according to the present invention closely resemble prior art conventional multiexciter swept-sinewave controllers in many respects. The substantial difference exists in the inclusion of means for updating impedance values and the use of a complex variable gain factor for buffering modifications to updated drive signals instead of a constant simple scalar value. No significant changes of materials are envisioned nor are any special constructions required.

Various modifications may be made to the invention without altering its value or scope. For example, various initial values of $c_n$ can be tried to optimize the magnitude of correction made on each repetitive step. Similarly, use of lower or higher quality components or lower or higher resolution digital components than are used in the best presently known embodiment of the invention, as described herein, would not change the basic character of the invention.

Of course, the uniqueness of the invention, as described herein, is not dependent upon use of any particular quantity, type, or configuration of component parts.

Another conceivable change would be to vary the sequence or nomenclature of quantities described by mathematical formula herein, without essentially changing the essence of the described invention.

As mentioned previously, while the best presently know embodiment 10 of the invention has been described herein by means of an example of use wherein an equal number of exciters 30 and sensors 32 are employed, the invention applies equally to "non-square" systems wherein the quantities of exciters 30 differs from the quantity of sensors 32 employed. Such a variation would require considering an impedance matrix to be a N by M dimensional matrix wherein N represents the quantity of exciters 30 and M represents the quantity of sensors 32, and making corresponding changes within the formulas given herein.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The multiexciter swept-sinewave vibration test controllers according to the present invention are particularly adapted for controlling the vibrations applied during vibration testing to structures having less than perfectly stable structural impedance characteristics. The predominant current usages are for testing the structural integrity and resistance to vibration of structures sufficiently large to be subject to significant complex vibration patterns at or near an expected frequency of induced vibration.

The multiexciter swept-sinewave vibration test controllers of the present invention may be utilized in any application wherein conventional multiexciter sine wave controllers are used. The main area of improvement is in the ability of the inventive controller to account for nonlinear and time variant characteristics of the structure under test such that instability and unreliable test results resulting from such nonlinear and time variant characteristics are avoided.

The control system 10 of the present invention affords the additional advantage that it keeps a test structure's response, at the fundamental frequency, relatively constant, and thus minimizes both the effects of externally added noise as well as the contribution of the finite resolution effects of the A/D subsystem 22 and instrumentation effects.

Since the multiexciter digitally sept sine wave vibration test controllers of the present invention may be readily constructed and are physically significantly similar to prior art conventional swept-sinewave controllers, it is expected that they will be acceptable in the industry as substitutes for the conventional controllers. Further, since the controller of the present invention differs substantially from many existing controllers primarily only in that minor modifications cause the inventive controller to function according to the inventive method, it is expected that many existing controllers may be modified to function in accordance with the present inventive method. For these and other reasons, it is expected that the utility and industrial applicability of the invention will be both significant in scope and long-lasting in duration.

I claim:

1. A method for controlling a plurality of analog sinewave drive signals in a multiexciter vibration test, comprising the steps of:
   a. stimulating a system under test with a plurality of exciters, each of said exciters being a transducer physically attached to an system under test, for converting said analog sinewave drive signals into mechanical motion;
   b. monitoring a response from said system under test using a plurality of sensors, each of said sensors being a transducer physically attached to said system under test, for converting said response into an analog response signal;
   c. converting said analog response signal into a first digital signal;
   d. modifying said first digital signal as a function of a reference spectrum vector and a measured system response matrix, said reference spectrum vector being a digital equivalent of a desired system motion, said measured system response matrix being a digital equivalent of a previously calculated system response, such that an updated digital signal is produced which is a digital equivalent of the analog sinewave drive signals required to cause said first digital signal to approach agreement with the reference spectrum vector;
   e. converting said updated digital signal into a yet another plurality of analog sinewave drive signals for again driving said exciters; and
   f. continuously repeating steps a. through e. while updating values of said measuring system response matrix as a function of values obtained during previous repetitions, such that a series of said measured system response matrices is produced which are used in the calculation of a series of said updated digital signals for producing a series of said pluralities of said analog sinewave drive signals, such that values for use in calculating a next subsequent of said updated digital signals are being obtained while each of said analog sinewave drive signals is being used to excite the system under test.

2. The method of claim 1, wherein:
   steps a. through e. are all accomplished in a less time than a period of said analog sinewave drive signals, such that each succeeding of said analog sinewave drive signals is updated according to its predecessor.

3. The method of claim 1, and further including:
   buffering effects of the measured system response matrix according to a complex number gain value such that, when said first digital signal is modified as a function of the measured system response matrix, values of said first digital signal are allowed to approach values of the reference spectrum vector at a rate determined as a function of a confidence value, said confidence value being a function of a difference between an instant set of values of said first digital signal and a previous set of values of said first digital signal.

4. The method of claim 3, wherein:
   said complex number gain value is determined as a function of a trial gain value, the reference spectrum vector, instant values of said first digital signal, and previous values of said first digital signal.

5. The method of claim 4, wherein:
   said trial gain value is, itself, a function of the instant values of said first digital signal and the previous values of said first digital signal.

6. The method of claim 1, wherein:
   odd numbered repetitions of steps a. through e. employ a trial gain value for controlling an amount by which said first digital signal is modified to produce said updated drive signal, during which odd numbered repetitions of the method updated values for said first digital signal are obtained by digitizing the resultant analog response signal, and also during which odd numbered repetitions of the method the updated values for said first digital signal are compared to previous values of said first digital signal for determining an updated complex number adjustment scale vector; and
   even numbered repetitions of the method employ the just determined updated complex number adjustment scale vector for controlling an amount by which a previous updated digital signal is modified by said first digital signal and the measured system response matrix to produce an instant updated digital signal, during which even numbered repetitions of the method the trial gain value is updated to reflect a confidence factor, said confidence factor being a function of the amount by which preceding iterations of said first digital signal have varied.

7. In a method for controlling a cyclical sequence for producing sets of sinewave drive signal digital equivalents in a multiexciter sinewave vibration test controller, said method including the steps of initially establishing a system impedance matrix estimate and an adjustment gain scalar value and further including the process of employing a feedback control algorithm to account for a plurality of structural cross coupling effects in a system under test by modifying a control error vector according to said system impedance matrix estimate, said control error vector being a difference function between an input response vector and a desired response vector and said system impedance matrix estimate being a matrix of values representing said cross coupling effects, an improvement for compensating for nonlinear and time variant characteristics of the system under test including the steps of:

a. stimulating the system under test using a first set of the sinewave drive signals and measuring a resultant physical response vector, the values of said first set of sinewave drive signals having been determined by modifying said control error vector according to a first proportionate part of said system impedance matrix estimate, said first proportionate part being the product of said system impedance matrix estimate multiplied by said adjustment gain scalar value;

b. using the resultant input response vector to calculate an appropriate value for a variable adjustment gain complex number value and then stimulating the system under test using a second set of sinewave drive signals, said second set of sinewave drive signals having been determined by modifying said control error vector according to a second proportionate part of said system impedance matrix estimate, said second proportionate part being the product of said system impedance matrix estimate multiplied by said variable adjustment gain complex number value; and c. repeating steps a. and b. such that during each of alternate repetitions of steps a. and b. a new value for said variable adjustment gain complex number is obtained, and during each of those cycles during which said variable adjustment gain complex number is not being obtained, said variable adjustment gain complex number is being used to determined said second proportionate part of said system impedance matrix estimate.

8. The improved method of claim 7, wherein:
during alternate repetitions of steps a. and b., the system impedance matrix estimate is updated as a function of the new value of said variable adjustment gain complex number.

9. The improved method of claim 7, wherein:
during alternate repetitions of steps a. and b., the adjustment gain scalar value is adjusted as a function of a difference between prior values of said control error vector.

10. The improved method of claim 7, wherein:
a drive matrix, values of said drive matrix being the sets of sinewave drive signal digital equivalents, is updated during each repetition of steps a. and b. by an amount determined by a step value, said step value being the control error vector modified by the system impedance matrix estimate and the adjustment gain scalar value;
said step value is algebraically summed to a present set of values of said drive matrix to determine a next subsequent set of values of said drive matrix; and
said system impedance matrix estimate is updated on at least alternate repetitions of steps a. and b. according to measured values of said control error vector.

11. The improved method of claim 10, wherein:
the adjustment gain vector value is updated during each repetition of steps a. and b. as a function of a difference between two prior values of the control error vector.

12. The improved method of claim 7, wherein:
said system impedance matrix estimate is the set of inverse values of digitized equivalents of the system response matrix estimate, said system response matrix estimate being calculated using data obtained during a previous repetition of steps a. and b.

13. The improved method of claim 7, wherein:
said adjustment gain scalar value is a complex number, such that each value within the system impedance matrix estimate will approach a corresponding value of an actual system impedance matrix during each update of the system impedance matrix estimate, said actual system impedance matrix being an ideal matrix representing instantaneous response characteristics of the system under test.

14. The improved method of claim 12, wherein:
values of the adjustment gain scalar are monitored as an indicator of instant reliability of the system impedance matrix estimate.

15. In a system for inducing controlled vibration patterns in an article under test, said system including a plurality of exciters physically attached to the article under test for producing a physical motion in the article under test, a plurality of sensors physically attached to the article under test for sensing a resultant motion, an A/D subsystem for converting analog sensor output into a digital output equivalent of sensor output, a digital controller for monitoring digital output from the A/D subsystem and for producing a digital equivalent of a drive signal, and a D/A subsystem for converting said digital equivalent of a drive signal into an analog drive signal for powering the exciters, said drive signal being a plurality of sinewaves with each of said sinewaves being modified in phase and amplitude by the digital controller such that said resultant motion tends to conform to a predetermined desired motion, an improvement comprising:

a first comparator means, logically situated first within said digital controller such that said first comparator means has as one of its inputs the digital output from the A/D subsystem, for comparing a control response vector to a reference spectrum vector and for producing a control error vector as an output, said control error vector representing the difference between said control response vector and said reference spectrum vector, said control response vector being a digital equivalent of said resultant motion and said reference spectrum vector being a digital equivalent of said predetermined desired motion;

a buffering means, logically situated within said digital controller after said first comparator means, for modifying a system impedance matrix according to an adjustment gain value and said control error vector and for producing a compensated error matrix as an output, said system impedance matrix containing inverse values of a temporal system response matrix estimate, said adjustment gain value being a value representing an amount by which it is desired that said temporal system response matrix estimate should be allowed to affect an overall outcome, and said temporal system response matrix being an estimate of an actual system response matrix, said actual system response matrix representing an ideal measurement of actual system response characteristics which cannot actually be achieved; and a second comparator means, logically situated within said digital controller after said buffering means, for comparing a current drive amplitude matrix and said compensated error matrix and for producing an updated drive amplitude matrix as an output, said current drive amplitude matrix being a digital equivalent of the plurality of sinewaves used for powering the exciters, which current drive amplitude matrix is returned to said second comparator by means of a feed back loop functioning to return the current drive amplitude matrix to the second comparator such that the current drive amplitude matrix is an input to the second comparator used in producing the updated drive amplitude matrix, said compensated error matrix being the output from the buffering means, and said updated drive amplitude matrix serving to replace said current drive amplitude matrix on a next subsequent cycle such that the digital controller produces a continuing series of updated drive amplitude matrices.

16. The improved system of claim 15, wherein:
said adjustment gain value is a complex number.

17. The improved system of claim 15, wherein:
said adjustment gain value is determined during a learning loop, said learning loop being a cycle of operation of the system wherein a learning loop gain value is substituted for said adjustment gain value and wherein system response to drive signal produced during said learning loop is measured and used to calculate an appropriate value for said adjustment gain value.

18. The improved system of claim 17, wherein:
said learning loop gain value is initially selected to be a real number less than 1.0.

19. The improved system of claim 17, wherein:
said learning loop gain value is allowed to approach a value of 1.0 as differences between succeeding of the control response vectors becomes less.

20. The improved system of claim 17, wherein:
each of said learning loops is followed by a control loop, said control loop being a cycle of operation of the system wherein said adjustment gain value is used to buffer the system impedance matrix such that the system impedance matrix is updated to approach in value the actual system response matrix; and each of said control loops is followed by a learning loop at least until the system is under control, as indicated by a value of said adjustment gain value near unity.

* * * * *